Figure 1:
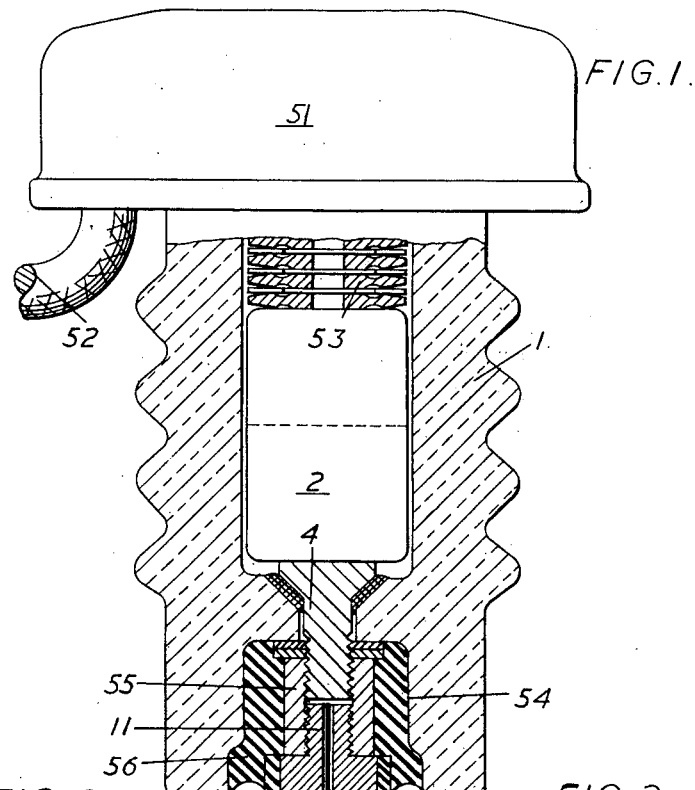

June 20, 1961  B. C. HICKS  2,989,608
ELECTRICAL PROTECTIVE EQUIPMENT
Filed May 28, 1957  2 Sheets-Sheet 1

Inventor
Bruce Clifford Hicks
By George H. Casey
Attorney

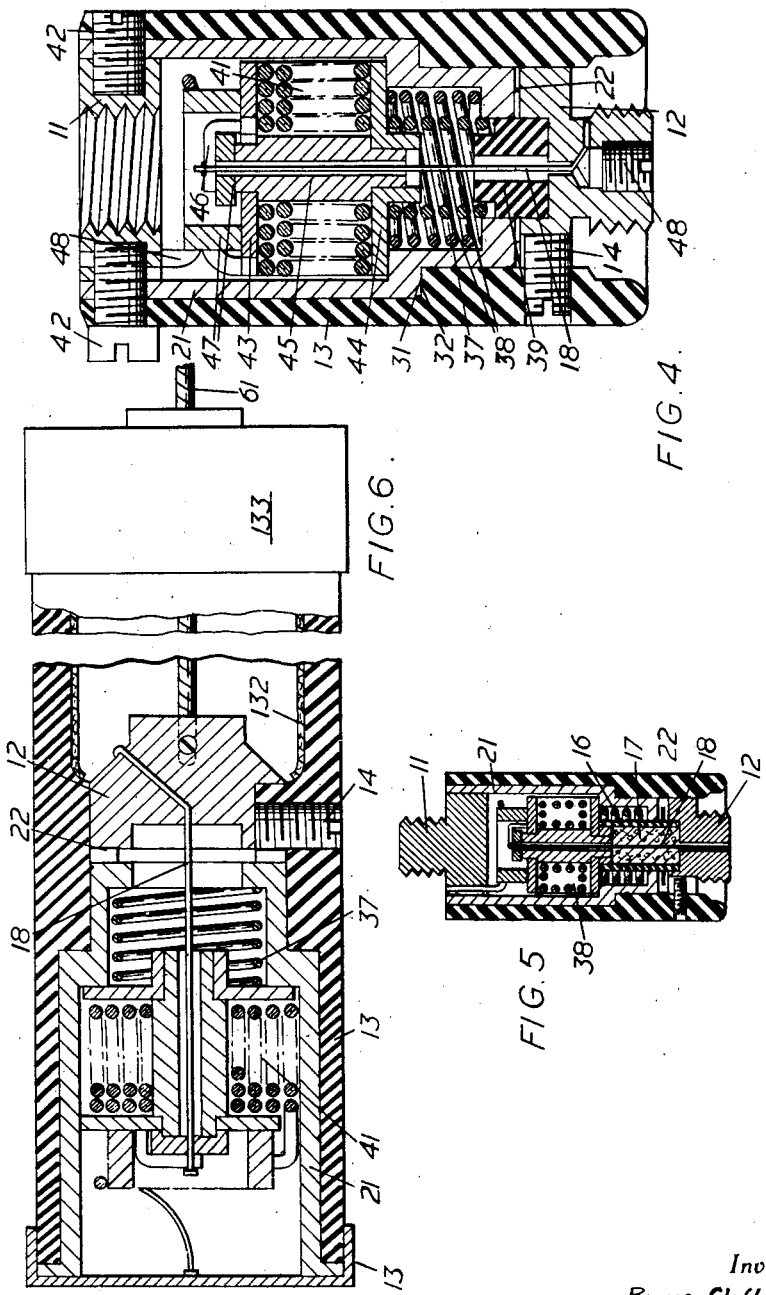

United States Patent Office 2,989,608
Patented June 20, 1961

2,989,608
ELECTRICAL PROTECTIVE EQUIPMENT
Bruce Clifford Hicks, Tottenham, London, England, assignor to E.M.P. Electric Limited
Filed May 28, 1957, Ser. No. 662,186
Claims priority, application Great Britain May 31, 1956
10 Claims. (Cl. 200—115)

The present invention relates to improvements in electrical protective equipment, such as fuses and surge diverters or lightning arresters and has for its general object to minimise liability of damage to the operative element of such equipment resulting from transients. For example a lightning arrester or surge diverter is designed to allow the flow of momentarily heavy surges but is liable to damage if an excessive amount of power follow current is allowed to flow. Conversely a line fuse is designed to carry current according to its rating but is liable to deterioration or damage in the event of the excessive or repeated flow of transients.

A more specific object of the invention is to provide a simple and effective safety device for avoiding or minimising risk of damage to such equipment resulting from the flow of transients and more particularly for isolating or disconnecting such equipment or for providing an alternative path for surge currents.

A further object of the invention is to provide a device having a discriminatory action in respect to surge currents and power follow currents. In the case of a surge diverter or lightning arrester this permits a prolonged or excessive power follow current to cause the device to operate to isolate or disconnect the diverter or arrester; while in the case of a line fuse surge currents are diverted into a path different from the fusible element.

In British patent application No. 23070/54 an isolator device for a surge diverter or lightning arrester is described which is based on the provision of expansible means brought into action by a flow of follow current through the arrester or diverter in a manner which isolates the diverter or arrester, for example by detaching the earth lead or terminal.

The present invention includes an isolator device for protective equipment wherein gas producing material is located in heat-transferring relation with a conductor carrying current flowing through the equipment, the whole arrangement being such that in the event of an excessive flow of power follow current said conductor is heated to a sufficient extent to cause the gas producing material, although not necessarily melted or fused, to produce gas in sufficient volume and at sufficient pressure to disconnect the equipment from the line, for example by detaching or ejecting the earth lead or the earth terminal.

The present invention also includes means to provide a discriminatory effect in association with protective equipment wherein the current path for normal current is shunted by a spark gap and said path is either of sufficient inherent impedance, or includes additional impedance, to cause a sufficient voltage to be produced across the spark gap to produce flash over at the gap thus providing a by-pass for surge currents separate from that traversed by normal current. In those cases where the discriminatory effect is required for the purpose of disconnecting the equipment in the event of fault power current the flow path for the fault current includes an element adapted to become heated or to melt under the effect of power current and thereby to disconnect or isolate the equipment. This result may be obtained by the action of expansible means, which may be a stressed spring or a charge of gas-producing material. In those cases where discrimination is required to provide an alternative path for surge currents, for example to prevent such currents from causing deterioration of a fusible element, the spark gap provides such a path. In all cases where additional impedance means is required; this may be provided by means of a resistor block or by an inductor.

Several forms of device according to the invention for application to electrical protective equipment are shown by way of example on the accompanying drawings in which FIGS. 1 to 5 show several forms of the safety device according to the present invention applied by way of example to the base section of a surge diverter or lightning arrester, while FIG. 6 illustrates the application of the invention to a line fuse. The arrangement of FIGS. 2 to 5 incorporates features providing for discrimination as between surge currents and power current, FIG. 1 also showing the manner in which the safety device of FIGS. 1 to 5 is fitted to the base of a diverter or arrester and provides the terminal for connection to an earth lead as indicated at E.

As shown in FIG. 1 the safety device according to the present invention indicated generally by the reference character S is adapted to be fitted to the base of a casing 1 housing a surge diverter or lightning arrester of well-known type and comprising for instance non-linear valve blocks as indicated at 2, and in general the safety device S provides a coupling interposed between the earth lead E and a metallic terminal element 4 at the base of the housing 1, so that any current traversing the valve blocks 2 whether surge current or power follow current, such as 60 cycle current, passes through the safety device S when flowing to earth through the lead E.

In certain unfavourable conditions the surge passing through the valve blocks 2 and through the safety device S may lead to an unduly prolonged flow of power follow current which if allowed to continue might damage the valve blocks 2 and might well result in serious damage to the diverter or arrester and the arrangement shown in FIG. 1 is designed to provide protection against such effects. For this purpose the device shown in FIG. 1 comprises upper and lower terminal members 11 and 12 respectively which are held in alignment by means of an outer sleeve 13 preferably of insulating material, the sleeve 13 being permanently fixed to the terminal member 11 while the terminal member 12 is free to slide in the sleeve, but rotation thereof within the sleeve is prevented by a pin 14 which engages a recess in the edge of the member 12. The two facing surfaces of the members 11 and 12 are provided with cylindrical projections 15 adapted to support a sleeve 16 which forms a closed chamber around the cylindrical space between the projections 15, said sleeve being preferably formed from a relatively strong and refractory material and said space housing a charge of gas-producing material or of explosive material 17.

The terminal members 11 and 12 are provided with a central bore to house a conductor wire 18 and the two ends of said wire 18 are permanently fixed to the members 11 and 12 or to members connected electrically to them. It will be seen that the wire 18 holds the members 11 and 12 in predetermined position and maintains endwise pressure upon the sleeve 16.

If desired the assembly including the conductor wire 18 may be sealed against the atmosphere and the wire itself may also be inherently free from liability to deterioration by atmospheric influences. If the conductor wire 18 is not sealed in this way a material is chosen for the wire which renders it free from liability to deterioration. The material chosen preferably has a greater specific resistance than copper in order that it shall not unduly fine in gauge but nevertheless it should preferably be capable of being soldered to the members at the two ends of the wire. In general it may be stated that suitable materials may be found in the range of nickel-iron alloys containing a relatively high proportion of nickel. The invention is not however limited to such materials or to fixing them to terminal members by soldering, as refractory metals such as nickel-chrome alloys can also be used.

In normal operation of the diverter or arrester, surge or lighning currents in the line pass through the valve blocks 2 and pass through the wire 18 to the earth lead E. Since such surges are normally of very short duration the wire 18 does not heat sufficiently to activate the charge 17. In the event of a prolonged power frequency, i.e. 60 cycle current flow following a lightning or other surge, as would cause damage to the valve blocks 2, the wire 18 is heated up to a temperature corresponding to the setting-off temperature of the gas-producing charge 17, resulting in the member 12 carrying the earth lead E being detached or ejected from the base of the safety device S thus terminating and interrupting the flow of follow current and preventing permanent damage to the arrester.

The present invention also provides modifications to a safety device of the character shown in FIG. 1 wherein provision is included to allow for discrimination for surge currents, and these features are applicable not only in the case where the protective equipment is designed to provide a path to earth for surge currents and the like, for example as in the case of a surge diverter or lightning arrester, but also to other types of protective equipment such as fuses which normally carry power frequency current but are liable to be damaged if excessive transients are allowed to flow through them.

Speaking broadly the discrimination feature according to the present invention is obtained by the provision of two alternative paths, one of which comprises a spark gap and this path being capable of carrying surge currents or the like while the other path is formed by a metallic conductive path and is adapted to be traversed by power frequency current.

In the case of lightning arresters or of surge diverters the spark gap provides the path followed by the passage to earth of surges while the metallic conductive path is traversed by power follow current and it may be arranged on the basis shown in FIG. 1 or in the manner described hereinafter with reference to FIGS. 3 and 4 to allow for detachment of an earth lead by the expansion of a pre-stressed spring upon fusing of a wire forming the conductive path.

Figure 2:
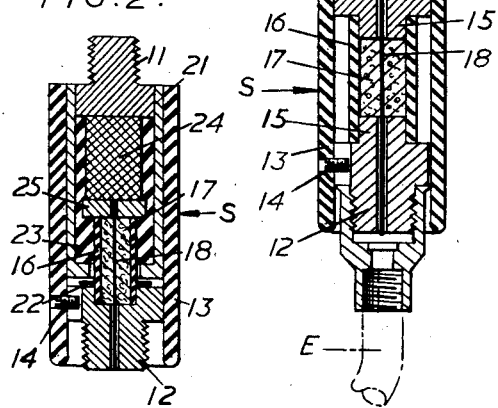
Figure 3:
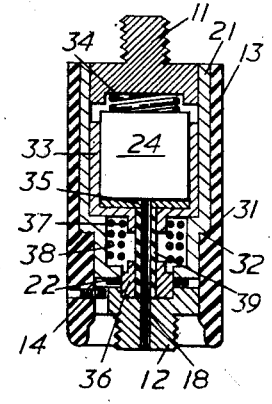

In FIGS. 2 to 6 the discrimination as between the two paths may be obtained in various ways. In some cases the conductor wire which may be arranged in the same way as the wire 18 in FIG. 1 may present sufficient inherent impedance to ensure that surge currents pass through the alternative spark gap path or alternatively as shown in FIGS. 2 and 3 an additional resistor element may be included. In a further arrangement shown in FIGS. 4, 5 and 6 the path including the conductor wire may embody an inductance such as ferrite beads on the conductor wire or an additional series inductor coil. In all these forms of the invention the spark gap elements are arranged within an outer casing and surround the conductor wire and the arrangement is such that when the wire becomes heated or melts the components of the spark gap are parted and the flow of power current to the earth lead E is interrupted as in FIG. 1.

Referring now to FIG. 2 of the drawings it will be seen that a safety device S is provided which may be fitted to a casing 1 as shown in FIG. 1 and it comprises an outer sleeve 13 of insulating material carrying terminal members 11 and 12 as in FIG. 1. The top terminal member 11 is, however, surrounded by a metal sleeve 21 having an inturned rim at its lower end and the lower face of which provides one element of a spark gap, the gap being maintained for example by a mica washer 22 which spaces the end face of said flange from the adjacent face of the lower terminal member 12 to form the desired spark gap. The terminal member 12 is free to slide in the sleeve 13 and rotation is prevented by the pin 14 as in FIG. 1. The sleeve 21 contains an inner sleeve 23 of insulating material which is hollowed out in its upper part to enclose a resistor block 24, having a value of the order of one ohm, in conductive contact with the member 11 and to which one end of a conductor wire 18 is attached, the other end of which is secured to the base of the member 12.

A sleeve 16 projects from a recess in the upper face of the member 12 towards a block 25 at the base of the resistor block 24 to form a chamber containing a charge 17 of explosive material or of gas-producing material. The threaded base of the member 12 serves as a terminal for attachment of the earth lead E as in FIG. 1.

It will be seen that the components are normally held in the assembled position shown in FIG. 2 by the conductor wire 18. Any surge type currents passing through the valve blocks 2 produce a voltage across the spark gap faces of the member 12 and of the inturned rim at the lower end of sleeve 21 such that the gap flashes over so that such currents pass harmlessly to earth through the lead E. In the event of a prolonged flow of power follow current such current follows the path represented by the conductor 18 and this becomes heated to fire the charge 17 which thereby ejects the terminal 12 and the earth lead connected to it.

FIG. 3 illustrates an arrangement which is generally similar to FIG. 2 but in this case the charge 17 is replaced by a pre-stressed spring. The upper terminal 11 is connected to the outer sleeve 13 and the latter serves slidably to accommodate the lower terminal member 12 rotation of the latter being prevented by the locating pin 14. Within the outer sleeve 13 is an inner sleeve 21 which in this case embodies an outer peripheral step 31 which seats against an inner step face 32 of the sleeve 13. An inwardly directed flange at the base of the sleeve 21 forms on its end face one element of a spark gap the other element of which is formed by the upper face of the member 12, a mica washer or the like 22 being interposed as in FIG. 2.

Within the sleeve 21 is a holder 33 surrounding a resistor block 24 and a spring 34 is interposed between the under face of the member 11 and the resistor block to maintain the latter in correct position in the holder 33. A conductive washer 35 at the base of the holder 33 serves as connection to one end of a conductor wire 18 which is adapted to fuse upon a prolonged flow of power frequency current.

A guide sleeve 36 pressing against a rebate in the upper face of the member 12 has a slidable fit within the inturned flange at the base of the sleeve 21 and a peripheral step at the upper edge of said sleeve is engaged by a spring 37 pressing upwardly against the under face of the holder 33, said spring thus tending to eject the terminal member 12. A further spring 38 presses against the inner radially directed face of the flange at the base of the sleeve 21 and thus tends to maintain the spark gap components in correct relative position as determined by the mica washer 22. The conductor wire or fusible element 18 is surrounded by a refractory tube 39 or by a series of ceramic beads or by a fibre tube which tends to localize the arc formed on melting of the conductor wire 18 and thus to secure an efficient expulsion effect.

The operation of this device is as follows:

Small surge currents of low amplitude pass harmlessly through the conductor wire or fusible element circuit. High surge currents, because of their very large amplitude, quickly build up a voltage across the impedance of the conductor wire or fusible element circuit causing the spark gap to flash over which thereby carries the remainder of the surge.

If there is a dangerous flow of power follow current on the other hand, this will pass through the resistor block 24 and the conductor wire or fusible element 18 which thereupon melts because of the large energy of these relatively long lower amplitude waves. The spring 37 then serves to eject the terminal member 12 from the base of the sleeve 13.

FIG. 4 shows a generally similar arrangement to FIG. 3 but instead of using a resistor block 24 the latter is replaced by an inductor indicated at 41. In other respects the construction is similar to that described with reference to FIG. 3 and the same reference characters have been applied thereto. In this case, a surge builds up a voltage across the spark gap because, to the relatively high frequency or steep wave front of a surge wave the inductor presents a high reactive impedance, thus causing a large voltage drop which flashes over the spark gap. Towards the relatively low frequency power current the inductor presents practically no impedance, thus allowing the latter to flow through the conductor wire or fusible element without building up sufficient voltage to cause the parallel spark gap to flash over.

In all other respects the devices operate as described with reference to FIG. 3 so a further detailed description is not necessary.

FIG. 4 also shows an alternative form of the terminal member 11 wherein this comprises a ring-shaped element having a threaded bore suitable for attachment to a male threaded terminal element such as the part 4 shown on FIG. 1 of the drawings. In this case the terminal ring-shaped member 11 is secured to the upper end of the sleeve 21 by means of grub screws 42. The inductor 41 may comprise top and bottom cheeks 43, 44 which are held in spaced relation by means of a spacer tube 45 preferably formed of a high permeability magnetic material embodying a central core to accommodate the fusible element 18. The upper end of this wire may if desired be welded or brazed to a lead 46 from one end of the inductor coil 41 the joint so formed bearing upon a washer 46. These parts may be surrounded as shown by a sleeve 47 providing a guide for the lead 48 running from the terminal member 11 to the other end of the inductor 41. The lower end of the fusible element 18 may be secured in position to the terminal member 12 by means of a grub screw 48. In this case also the locating pin 14 is generally in the form of a grub screw and this arrangement may be adopted in any of the accompanying drawings.

FIG. 5 shows an arrangement generally similar to that of FIG. 4 but in place of using a pre-stressed spring for ejection of the terminal member 12 this operation is performed in the same way as in FIGS. 1 and 2 by means of an explosive or gas-producing charge 17 located within a sleeve 16. In this case the spring 38 tends to maintain the spark gap components formed by the upper face of the terminal member 12 and the inwardly directed flange at the base of the sleeve 21 in correct operative position as determined by the mica washer 22. The operation will readily be understood since it is similar to that described with reference to FIGS. 3 and 4 except that ejection of the terminal member 12 is effected when the charge 17 is heated by heating or fusing of the conductor wire or fusible element 18.

In all the embodiments described with reference to FIGS. 2 to 5 the faces defining the spark gap, i.e. the radial faces on the two sides of the mica washer 22 are formed of or coated with substances which provide desired properties. Preferably one surface is formed of a refractory metal and the other of a more fusible metal or both surfaces are formed of a refractory metal. For example one surface may be coated with or formed of molybdenum while the other face may be formed of or coated with copper or tin.

FIG. 1 also shows the manner in which any of the safety devices S of FIGS. 1 to 5 may be applied to a surge or lightning arrester having a casing 1 as already mentioned. Said casing is covered at the top by means of a protective cap 51 to which a lead 52 coming from the live line to be protected is connected. This lead provides connection to a spark gap assembly 53 in conductive contact with the valve blocks 2, the latter in turn pressing in electrical contact against the terminal 4. The under side of the casing 1 may be formed with a recess 54 and a terminal member 11 of the device S of the type shown in FIGS. 1 to 3 and 5 may screw into a sleeve 55. Alternatively a terminal fitting 11 of the character shown in FIG. 4 may screw directly on to the terminal 4. The space formed between the upper edge of the casing 13 and the safety device S and the base of the recess 54 may be filled in with a suitable insulating material, such as an epoxy resin, as indicated at 56 to provide protection against the entry of moisture.

The melting of the fusible element 18 in FIGS. 3 and 4 or the heating of the powder charge 17 in FIGS. 1, 2 and 5 causes or permits displacement of the member 12 so as to disconnect the current path or it may operate a mechanical or other device capable of operating a separate disconnecting mechanism, which may be for example, a normal type of fuse disconnecting device, or in the case of a lightning arrester one of the connecting leads to the arrester, normally the earth lead, may be disconnected or expelled.

Where the equipment to which the isolator device is to be fitted is not provided with a flexible earthing lead, the device may be constructed on the same principle and may be housed within the equipment itself, physical movement either of the casing, similar to part 13 shown on the accompanying drawings, or of either gap electrode, being permitted by mounting the part or parts concerned in a suitable housing or cage.

As applied to a fuse disconnector device the isolator device may be arranged in substantially the same way but upon fusing of the fusible elements a mechanical movement is obtained which through suitable linkage is arranged to release a catch mechanism holding a fuse body in the working position so that said fuse body is freed and may drop out of the working position, for example by the action of gravity or by means of a further spring.

Another application of the present invention is for use with low voltage surge diverters, for example for the anode circuits of mercury arc rectifiers or low voltage systems where protection against internal system surges is required. In this case again any excessive flow of power frequency current through the diverter results in operation of a disconnecting device either to move a fuse cartridge to a disconnecting position or detaching or ejecting one lead to the protected equipment or otherwise isolating the equipment.

As indicated above, the features of the present invention are also applicable to line fuses, especially of the expulsion type, for the purpose of preventing unnecessary deterioration of the fusible element due to transient surges. The same general arrangement already described is adopted with appropriate modification allowing for the altered conditions. The fusible element or heater similar to part 18 is selected to fuse under predetermined fault conditions and normally carries the load current. If the device is designed for an expulsion type fuse it is surrounded by a fibre tube or other gas-producing materials like boric acid, the tube body and the filling material incorporated therein being chosen to provide fuse operation of the expulsion principle. In this case however the fusible element need not be arranged to hold the spark gap elements in an operative position against the action of a spring similar to 38 on the accompanying drawings; that is to say the inductance element 41 and the fusible element 18 are connected electrically in series; somewhat as shown, and both elements are shunted by the spark gap elements but the latter may not be movable relatively or in relation to the casing of the device. On the occurrence of surges in the line the effect of the inductive element is to provide a high impedance path through the fusible element so that the surge current causes the gap to break down and flash over. The normal load current is however carried by the fusible element and an overload of power current results in fusing of the said element in the normal manner.

An expulsion fuse of this character is shown on FIG. 6; in this case the sleeve 13 forms the outer case of the fuse and may be formed of refractory material. It is provided with metal end caps 131, 133, the former being in electrical contact with a metal inner sleeve 21 seating against a step in the sleeve 13. The sleeve 21 is provided with an internal step against which an inductor assembly 41 is seated in the manner shown in FIG. 4. A fusible element 18 (which may be in the form of a steel or nickel-chromium strain wire with the fuse wire proper laid around it in a helical path) is supported at one end against the assembly 41 and at the other end by a terminal member 12 and the latter is also connected to a flexible wire 61 subjected to the action of an external spring, not shown. A spring 37 between the internal step on the inner sleeve 21 and the assembly 41 tends to close one face of the member 12 against the under side of the sleeve 21, the correct spark gap being maintained at this point by means of a mica washer 22. One end of the inductor winding of assembly 41 is connected to the element 18 while the other end is connected to the cap 133. The core of the sleeve 13 is provided with a fibre lining 132 for the part thereof surrounding the wire 61.

It will be seen that the parts associated with the fusible element 18 are very similar to the arrangement of FIG. 4; the terminal member 12 is freely slidable in the sleeve 13 and is located by the pin or grub screw 14. In operation, surge currents or transients flash over at the spark gap defined by washer 22 and do not traverse the element 18. In the event of excessive power frequency current the element 18 fuses and the spring associated with the wire 61 causes the member 12 to move outwardly of the sleeve 13 and thus produces an expulsion action in association with the fibre lining of the sleeve 13 in well-known manner.

What I claim is:

1. An isolator for a lightning arrester comprising an outer sleeve, a terminal connectible to an electrode of the arrester and fixedly connected to said sleeve, a movable terminal slidably connected to said outer sleeve in spaced relation to said fixed terminal and connectible to a lead forming part of the circuit between the line and ground, means including an inner tubular member in coaxial relation with said outer sleeve forming a closed chamber located between said terminals, a heating wire extending through said closed chamber and providing a conductive path connecting said terminals, said heating wire being constituted of a material having high specific resistance enabling it to transmit normally to ground high voltage surges of short duration, but generating a high degree of heat when subjected to an excessive flow of power follow current such as would cause damage to the lightning arrester, and a material confined in said closed chamber in heat transferring relation to said wire and capable upon being heated by the latter to said high degree of heat of instantly producing a gas under pressure capable of rapidly ejecting said movable terminal from the sleeve, said chamber forming means at said end of said closed chamber farthest from said movable terminal being fixed with relation to said tubular member and said tubular member being constructed to hold such produced gas in confinement and together controlling the force created by said produced gas so that it is directed to the instantaneous, slidable ejection of said movable terminal from said outer sleeve, whereby the arc formed between the end terminals by such excessive flow of power follow current will be extinguished before any line fuses protecting the line to which the arrester is connected, have opened the power circuit.

2. An isolator for a lightning arrester as defined in claim 1 which comprises means providing a spark gap connected in parallel with said heating wire between said terminals and providing a discharge path through said gap for high amplitude surges.

3. An isolator for a lightning arrester as defined in claim 2 which comprises a resistor connected in series with said wire between said terminals, said spark gap being connected in parallel with said series connected heating wire and resistor.

4. An isolator for a lightning arrester comprising an outer sleeve, a terminal connectible to an electrode of the arrester and fixedly connected to said sleeve, a movable terminal slidably connected to said outer sleeve in spaced relation to said fixed terminal and connectible to a lead forming part of the circuit between the line and ground, means forming a closed chamber located between said terminals, said chamber forming means including an inner tubular member constituted of insulating material arranged in coaxial relation with said outer sleeve, said movable terminal seated on the adjacent end of said tubular member, and a heating wire connected at its ends to said chamber forming means and holding said movable terminal seated on said associated end of said tubular member, said heating wire extending through said closed chamber to provide a conductive path therethrough and being constituted of a material having high specific resistance enabling it to transmit normally to ground high voltage surges of short duration, but generating a high degree of heat when subjected to an excessive flow of power follow current such as would cause damage to the lightning arrester, and a material confined in said closed chamber in heat transferring relation to said wire and capable upon being heated by the latter to said high degree of heat of instantly producing a gas under pressure capable of rapidly ejecting said movable terminal from the sleeve, said chamber forming means at said end of said closed chamber farthest from said movable terminal being fixed with relation to said tubular member and said tubular member being constructed to hold such produced gas in confinement and together controlling the force created by said produced gas so that it is directed to the instantaneous, slidable ejection of said movable terminal from said outer sleeve, whereby the arc formed between the end terminals by such excessive flow of power follow current will be extinguished before any line fuses protecting the line to which the arrester is connected, have opened the power circuit.

5. An isolator for a lightning arrester comprising an outer sleeve, a terminal connectible to an electrode of the arrester and fixedly connected to one end of said sleeve, a movable terminal located in the other end of said outer sleeve in spaced relation to said fixed terminal and connectible to a lead forming part of the circuit between the line and ground, an inner portion of said movable terminal slidably engaging the inner wall of said sleeve and being spaced from the terminal end of said sleeve, whereby outward slidable movement of said movable terminal relative to said outer sleeve is controlled by the latter until said movable terminal is ejected therefrom, means including an inner tubular member in coaxial relation with said outer sleeve forming a closed chamber spaced from said outer sleeve and located between said terminals, a heating wire extending through said closed chamber and providing a conductive path connecting said terminals, said heating wire being constituted of a material having high specific resistance enabling it to transmit normally to ground high voltage surges of short duration, but generating a high degree of heat when subjected to an excessive flow of power follow current such as would cause damage to the lightning arrester, and a material confined in said closed chamber in heat transferring relation to said wire and capable upon being heated by the latter to said high degree of heat of instantly producing a gas under pressure capable of rapidly ejecting said movable terminal from the sleeve, said chamber forming means at said end of said closed chamber associated with said one end of said outer sleeve being fixed with relation to said tubular member and said tubular member being constructed to hold such produced gas in confinement and together controlling the force created by said produced gas so that it is directed to the instantaneous, slidable ejection of said movable terminal from said outer sleeve, whereby the arc formed between the end terminals by such excessive flow of power follow current will be extinguished before any line fuses protecting the line to which the arrester is connected, have opened the power circuit.

6. An isolator for a lightning arrester comprising an outer sleeve, a terminal connectible to an electrode of the arrester and fixedly connected to said sleeve, a movable terminal slidably connected to said outer sleeve in spaced relation to said fixed terminal and connectible to a lead forming part of the circuit between the line and ground, means forming a closed chamber located between said terminals, said chamber forming means including an inner tubular member constituted of insulating material arranged in coaxial relation with said outer sleeve, said movable terminal seated on the adjacent end of said tubular member, and a heating wire connected at its ends to said chamber forming means and holding said movable terminal seated on said associated end of said tubular member, said heating wire extending through said closed chamber to provide a conductive path therethrough and being constituted of a material having high specific resistance enabling it to transmit normally to ground high voltage surges of short duration, but generating a high degree of heat when subjected to an excessive flow of power follow current such as would cause damage to the lightning arrester, a conductive sleeve arranged in coaxial relation between said outer sleeve and said tubular member, said conductive sleeve being conductively connected to said fixed terminal and extending towards said movable terminal to a point short thereof so as to provide a spark gap between said conductive sleeve and said movable terminal capable of passing high voltage of short duration to said movable terminal, and a material confined in said closed chamber in heat transferring relation to said wire and capable upon being heated by the latter to said high degree of heat of instantly producing a gas under pressure capable of rapidly ejecting said movable terminal from the sleeve, said chamber forming means at said end of said closed chamber farthest from said movable terminal being fixed with relation to said tubular member and said tubular member being constructed to hold such produced gas in confinement and together controlling the force created by said produced gas so that it is directed to the instantaneous, slidable ejection of said movable terminal from said outer sleeve, whereby the arc formed between the end terminals by such excessive flow of power follow current will be extinguished before any line fuses protecting the line to which the arrester is connected, have opened the power circuit.

7. An isolator for a lighting arrester as defined in claim 6 which comprises a resistor connected in series with said heating wire in said conductive path between said terminals.

8. An isolator for a lightning arrester comprising an outer sleeve, a terminal connectible to an electrode of the arrester and fixedly connected to said sleeve, a movable terminal slidably connected to said outer sleeve in spaced relation to said fixed terminal and connectible to a lead forming part of the circuit between the line and ground, means forming a closed chamber spaced from said outer sleeve and located between said terminals, said chamber forming means including an inner tubular member constituted of insulating material arranged in coaxial relation with said outer sleeve, and a block seated on the end of said tubular member adjacent to said fixed terminal, a resistor block located between said fixed terminal and said seated block and in conductive contact with said fixed terminal, a heating wire extending through said closed chamber and seated block and providing a conductive path connecting said resistor block with said movable terminal, said heating wire being constituted of a material having high specific resistance enabling it to transmit normally to ground high voltage surges of short duration, but generating a high degree of heat when subjected to an excessive flow of power follow current such as would cause damage to the lightning arrester, a conductive sleeve arranged in coaxial relation between said outer sleeve and said tubular member, said conductive sleeve being conductively connected to said fixed terminal and extending towards said movable terminal to a point short thereof so as to provide a spark gap between said conductive sleeve and said movable terminal capable of passing high voltage of short duration to said movable terminal, and a material confined in said closed chamber in heat transferring relation to said wire and capable upon being heated by the latter to said high degree of heat of instantly producing a gas under pressure capable of rapidly ejecting said movable terminal from the sleeve, said seated block at said end of said closed chamber adjacent to said fixed terminal being fixed with relation to said tubular member and said tubular member being constructed to hold such produced gas in confinement and together controlling the force created by said produced gas so that it is directed to the instantaneous, slidable ejection of said movable terminal from said outer sleeve, whereby the arc formed between the end terminals by such excessive flow of power follow current will be extinguished before any line fuses protecting the line to which the arrester is connected, have opened the power circuit.

9. An isolator for a lightning arrester comprising an outer sleeve, a terminal connectible to an electrode of the arrester and fixedly connected to said sleeve, a movable terminal slidably connected to said outer sleeve in spaced relation to said fixed terminal and connectible to a lead forming part of the circuit between the line and ground, means normally providing a conductive path between said terminals for high voltage surges of short duration, and means for extinguishing an arc formed between said terminals as a result of an excessive flow of power follow current such as would cause damage to the lightning arrester before any line fuses protecting the line to which the arrester is connected have opened the power circuit, said extinguishing means including an inner tubular member in coaxial relation with said outer sleeve forming a closed chamber spaced from said outer sleeve and located between said terminals, a heating wire extending through said closed chamber and providing a conductive path connecting said terminals, said heating wire being constituted of a material having high specific resistance enabling it to generate a high degree of heat when subjected to an excessive flow of power follow current such as would cause damage to the lightning arrester, and a material confined in said closed chamber in heat transferring relation to said wire and capable upon being heated by the latter to said high degree of heat of instantly producing a gas under pressure capable of rapidly ejecting said movable terminal from the sleeve, said chamber forming means at said end of said closed chamber farthest from said movable terminal being fixed with relation to said tubular member and said tubular member being constructed to hold such produced gas in confinement and together controlling the force created by said produced gas so that it is directed to the instantaneous, slidable ejection of said movable terminal from said outer sleeve so as to immediately extinguish the arc created by such condition.

10. In a valve type lightning arrester having valve elements, the combination therewith of an isolator comprising an outer sleeve connected in insulated relation to said arrester, a terminal connectible to an electrode of the arrester connected in series with said valve elements thereof and fixedly connected to said sleeve, a movable terminal slidably connected to said outer sleeve in spaced relation to said fixed terminal and connectible to a lead forming part of the circuit between the line and ground, means including an inner tubular member in coaxial relation with said outer sleeve forming a closed chamber spaced from said outer sleeve and located between said terminals, a heating wire extending through said closed chamber and providing a conductive path connecting said terminals, said heating wire being constituted of a material having high specific resistance enabling it to transmit normally to ground high voltage surges of short duration, but generating a high degree of heat when subjected to an excessive flow of power follow current such as would cause damage to the lightning arrester, and a material confined in said closed chamber in heat transferring relation to said wire and capable upon being heated by the latter to said high degree of heat of instantly producing a gas under pressure capable of rapidly ejecting said movable terminal from the sleeve, said chamber forming means at said end of said closed chamber farthest from said movable terminal being fixed with relation to said tubular member and said tubular member being constructed to hold such produced gas in confinement and together controlling the force created by said produced gas so that it is directed to the instantaneous, slidable ejection of said movable terminal from said outer sleeve, whereby the arc formed between the end terminals by such excessive flow of power follow current will be extinguished before any line fuses protecting the line to which the arrester is connected, have opened the power circuit.

References Cited in the file of this patent

UNITED STATES PATENTS

| | | |
|---|---|---|
| 2,158,859 | Horikoshi | May 16, 1939 |
| 2,305,394 | Smith | Dec. 15, 1942 |
| 2,314,017 | Pittman | Mar. 16, 1943 |
| 2,315,320 | Earle | Mar. 30, 1943 |
| 2,374,560 | Nelson | Apr. 24, 1945 |
| 2,453,688 | Yonkers | Nov. 9, 1948 |
| 2,551,858 | Stoelting | May 8, 1951 |
| 2,777,095 | Stoelting | Jan. 8, 1957 |